Sept. 10, 1940.  H. E. WOODRING  2,213,973
ELECTRICAL CIRCUIT TESTER
Filed Nov. 3, 1937
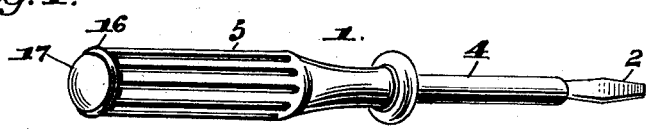
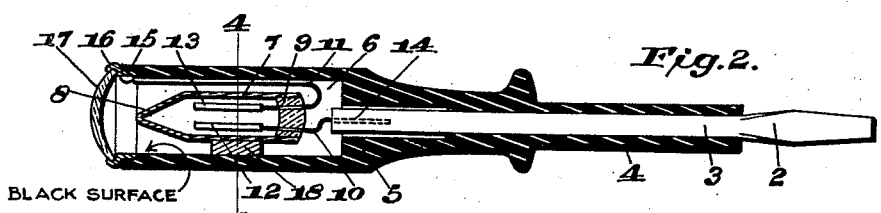
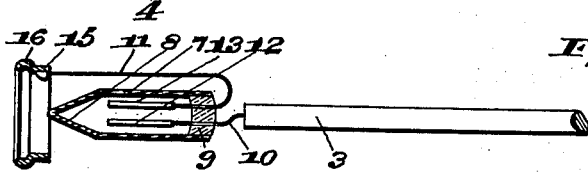
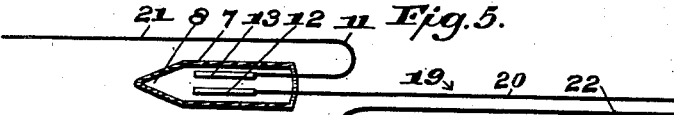
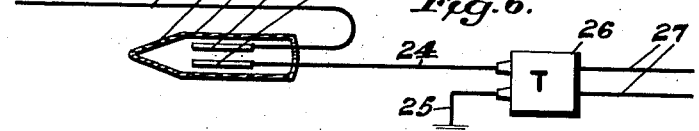
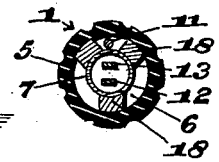
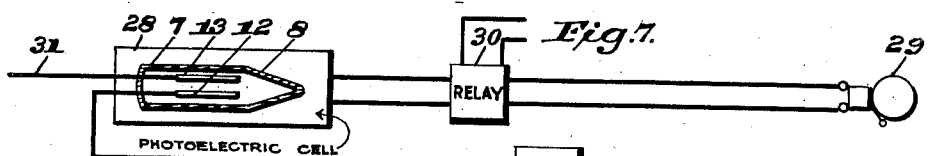
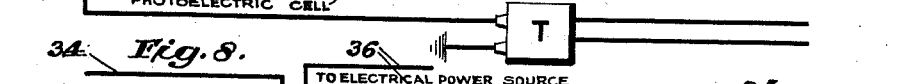
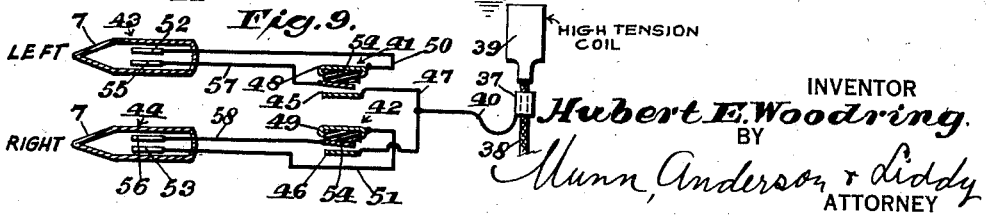
INVENTOR
Hubert E. Woodring.
BY
Munn, Anderson, & Liddy
ATTORNEY Patented Sept. 10, 1940

2,213,973

UNITED STATES PATENT OFFICE 2,213,973

ELECTRICAL CIRCUIT TESTER

Hubert E. Woodring, Denver, Colo.

Application November 3, 1937, Serial No. 172,623

3 Claims. (Cl. 175—183)

This invention relates to improvements in testing devices for electrical circuits. In devising the improved instrument particular regard was had to enabling the determination of the live, or what is commonly called the hot side, of an electrical circuit.

Preparatory to doing electrical work it is important for the electrician to know which one of two wires is the live or hot wire, because there is no convenient means for discovering this by testing, and it is frequently the case that the worker will experience a sharp shock before he realizes that he has then run across the live side of the circuit. Of course the surest way of preventing mishaps of this sort is to open the circuit at the switch box, but in many instances an electrician will not take the trouble to do this, it being entirely expedient to work upon the circuit even though it contains a potential current flow provided care is exercised in handling the wires, and provided further that he knows which of the two wires is the live side.

The instrument herein disclosed is so organized that its metallic blade can be inserted in each of the two prong openings of a common electrical outlet, and when it touches the live wire, there will be an indicating glow, the only pre-requisite to this test being that the operator shall touch the metal ferrule with his fingers and thus introduce his body as an electrical capacity.

It is not alone to this particular use that the instrument is adapted to be put. It can be employed in testing lines of all sorts, not necessarily one that terminates at the usual electrical service outlet. Moreover, the principle of the invention is adaptable to other but kindred purposes, for example, as a burglar alarm. With this premise in mind the objects of the invention are as follows:

First, to provide an electrical testing instrument which will operate to give an indicating glow when touched to only one side of an electrical circuit, provided that said side is the hot side and provided further that the operator introduces his body as an electrical capacity.

Second, to provide an electrical testing instrument which has a metallic blade that is adapted to be inserted in the prong openings of any ordinary electrical service outlet, the neon lamp which the instrument contains glowing when included in a circuit comprising a live wire with which the blade is in contact and the body of the person holding the instrument.

Third, to utilize the principle last stated for the operation of burglar and other alarms.

Other objects and advantages will appear in the following specification, reference being had to the accompanying drawing, in which:

Figure 1 is a perspective view of the improved electrical circuit tester.

Figure 2 is a central longitudinal section thereof.

Figure 3 is a diagrammatic view illustrating the wire diagram.

Figure 4 is a cross section taken on the line 4—4 of Fig. 2.

Figure 5 is a diagram illustrating one adaptation of the principle of the tester to a signal.

Figure 6 is a diagram illustrating a second adaptation of the principle of the tester to a signal circuit including a transformer.

Figure 7 is a diagram illustrating a third adaptation of the principle of the invention to a signal circuit including a photo-electric cell.

Figure 8 is a diagram illustrating a fourth adaptation of the principle of the invention to a burglar or other alarm.

Figure 9 is a diagram illustrating a fifth adaptation wherein the principle of the tester is used as a direction signal.

In carrying out the invention the instrument 1 is made to comprise a metal blade 2 on the order of a screw driver blade. In fact the instrument can be used as a screw driver but this is recommended for light work only, thus to avoid breakage.

The integral shank 3 of the blade 2 is firmly set in the sleeve 4 that forms part of a handle 5. The sleeve and handle are in one piece and are constructed of an electrical insulating substance of any preferred kind. Bakelite would be suitable, but this is stated merely for example.

A hollowed-out place 6 in the handle 5 provides a chamber or casing which mainly contains a small neon tube 7. This comprises a glass capsule which is closed at 8 and closed by a seal at 9 after the tube has been filled with neon gas at low pressure. The seal 9 constitutes the mount for the wires 10, 11, the respective ones of which carry the electrodes 12, 13.

These electrodes are spaced, and inasmuch as they are situated in a gaseous atmosphere that portion of the latter situated between the electrodes becomes an electrical conducting bridge when the instrument is touched to a hot wire at its blade 2.

A noteworthy feature respecting these electrodes is that they are contiguously placed and are parallel. This simple arrangement adds to the capacity effect and greatly increases the efficiency of the tester. In other words, the gas in the tube will glow more brightly.

The other end of the wire 10 is permanently connected at 14 to the shank 3. The wire 11 is permanently connected at its other end to a metal ferrule 15, which is fixedly set in the rim of the originally open end of the chamber 6 through which the only view of the tube can be had. Said ferrule has an exposed bead 16 and this the operator must touch when he holds the instrument in his fingers, so as to complete the circuit through the neon tube 7 from the source of current to his body.

A lens 17 is set at its rim in the bead 16. This lens can be substituted by a jewel of the desired color, its sole purpose being to reveal to the operator the glowing gas of the tube 7 when the electrodes in the latter are energized. The light thus given off is accentuated by the dark interior of the casing, and since the sight opening is in the end of the device and not in the side, the operator will automatically look into the end of the device in a straight line. This means that the operator can test for hot wires in close and practically inaccessible places without danger to himself. The diagrammatic arrangement of the wiring is more clearly illustrated in Fig. 3 than in Fig. 2 but in order to avoid unnecessary duplication of description the same reference numerals have been applied.

Reverting to Fig. 2 the neon tube 7 is held centrally on the chamber 6 by any appropriate kind of spacing means (Fig. 4) for example a felt or rubber washer or the few spacing elements shown. In any event the spacing means comprises some firm packing material which will adequately hold the tube and yet not damage the latter when the assemblage is made.

Thus far it will be understood that the operation of the testing instrument is as follows: the operator takes hold of the handle 5 in such a manner that one or more of the fingers of his hand touch the exposed bead 16. The blade 2 is then inserted in each of the prong openings of an electrical current outlet, and when the blade touches the live or hot wire enough current will flow in the shank 3, through the neon tube 7 and into the body of the operator to cause the gas to glow.

The tester responds best to alternating or pulsating current. Such a current produces a strong signal light.

If the blade 2 is touched to the grounded side of the circuit there will not be any response. The foregoing escape of current is so infinitesimal as not to affect the operator. In fact the operator's body merely acts as an electrical capacity and there is no passage of current through his body. Thus it is important to the working of the invention that the operator's body be employed as an electrical capacity, no ground connection of any sort being required.

This principle of bringing about the operation of a neon tube by connecting one of its electrodes with a current source and dead-ending its other electrode at a body having electrical capacity is subject to a wide variety of applications other than merely testing for the hot side of a line. It is not feasible to make a disclosure of all such applications, but attention is directed to Figures 5, 6, 7, 8 and 9 which show a few. In each of these figures the same reference numerals are applied to corresponding parts of the tube 7.

In Fig. 5 the neon tube 7 is located in an electrical circuit 19 by permanently connecting its electrode 12 with the live wire 20. This wire has an extension 21 which has one of its ends connected to the electrode 13. The other end of the wire 21 will be led off to any desired point where it is adapted to be contacted by a person. When such contact occurs the tube 7 will become illuminated and the arrangement in Fig. 5 therefore constitutes a signal. The other wire 22 of the circuit 19 may be grounded as shown, or not.

Reference is next made to Fig. 6, which is largely a duplication of the arrangement in Fig. 5, and illustrates the same principle as Fig. 5, inasmuch as the neon tube 7 is caused to perform a single function. A wire 23 extends off to a place where it is adapted to be contacted by a human body, the occurrence in that event being to make the tube 7 glow and thus produce a visual signal.

The distinction from Fig. 5 is that in Fig. 6 the neon tube 7 is introduced in the non-grounded wire 24 of a high tension transformer circuit. The grounded wire of this circuit is designated 25. The transformer 26 and the wires which lead to the electrical power supply are commonly designated 27.

Figure 7 illustrates two important variations from the previous arrangements, first that relationship of the neon tube 7 to a photoelectric cell diagrammatically designated 28, wherein the lighting or darkening of the neon tube 7 will affect the cell 28 and cause the operation of an audible alarm 29 through the intermediate operation of a relay 30. The neon tube 7 is located in a current source similar to the arrangement in Fig. 6, the touching of the wire 31 causing the operation of the neon tube, as before stated. The alarm 29 can be regarded as a burglar alarm.

Figure 8 illustrates an arrangement much on the order of Fig. 7 but omitting of photoelectric cell of the latter. A high voltage transformer is again shown, the ungrounded wire 32 of which connects with the electrode 12 of the tube 7 as in each of Figs. 6 and 7. A relay 33 is interposed in the ungrounded signal or feeler wire 34. The relay functions to actuate the signal 35 from the low-tension current line 36 when the feeler wire 34 comes into contact with an electrical capacitance.

In each of Figs. 5 and 6 the touching of the respective wires 21, 23 to a body having an electric capacity, whether that be the human body or not, will set the neon tube 7 in operation to produce a visual signal. In Figs. 2 and 3 this signal designates the hot side of an electric circuit. In Figs. 5 and 6 the indication is something else. In Fig. 7 the indication occurs through the sounding of the alarm 29 by the intervention of the photoelectric cell 28, and in Fig. 8 the arrangement causes both a visual signal at 7 and an audible signal at 35.

Figure 9 illustrates the use of the principle of the invention as a direction signal. This purpose is accomplished very simply by means of the following fundamental structure, such embellishments as direction arrows, lettered insignia and the like being capable of addition without invention or without affecting the setup.

In order to secure the necessary current to operate the neon tubes 7, which may comprise one or more tubes, a quick-detachable fastener clip 37 is slipped over the high tension lead 38 from the coil 39 of any automobile. Current is induced in the wire 40 fastened to the metal clip 37. Two push buttons 41, 42 are used, one for a left signal 43, the other for a right signal 44.

The induced current is brought to the respective lower contact 45, 46 of each push button 41, 42 by means of an insulated cable 47. Connected to the respective metal ring 48, 49 at the top and around each push button 41, 42 is the wire 50, 51 of the respective electrode 52, 53 of the respective lamp 7. The center portion 54 of each push button is made of insulating material, and at the metal contact bottom of each insulating center the second electrode 55, 56 of the respective lamp is connected by a wire 57, 58.

When the operator places his finger on the selected push button, for example 41, touching the metal ring 48, current flows from the induced current wire 40 and cable 47, through contact 45, wire 57, lamp 7 of the left signal 43, wire 50 and through the metal ring 48 into the operator's body. Thus the principle of operation is identical with that in any of the previous forms. The reason for using a make-contact push button is to avoid having either lamp glow slightly all the time.

I claim:

1. A testing instrument comprising a casing which is hollow and has one open end, a rare gas tube set in the casing and visible only by looking into said open end, said tube containing spaced electrodes, the light given off by the gas when the electrodes are energized being accentuated by the darkness surrounding said tube in the casing, means connected to one of the electrodes and being adapted to probe the wires of an alternating electrical circuit, and means by which to connect the other electrode with the body of a person handling said instrument thereby to provide an electrical capacity and cause the energization of said electrodes.

2. A testing instrument, comprising a metallic shank having a probing blade, an insulating handle with a sleeve in which the shank is fixedly set, said handle having a chamber with one originally open end, a rare gas tube situated in the chamber, said tube having radially situated spaced electrodes sealed therein, spacing means supporting the tube medially of the chamber, a connection between the shank and one of the electrodes, a metallic ferrule set in the open end of the chamber and having a covering element secured therein, and a connection between another electrode and said ferrule.

3. A testing instrument comprising a metallic shank having a probing blade, an insulating handle by one end of which said shank is fixedly carried, said handle having a chamber open at one end opposite to the blade, a rare gas tube situated in the chamber and adapted to be seen only through said open end, said tube having electrodes sealed therein, the electrodes being parallel to each other and closely spaced so as to enhance the capacity effect and adapt the instrument to testing low voltages, spacing means radially around the tube holding the latter centered in the chamber and away from the wall of the chamber, a connection between the shank and one of the electrodes, and a metallic member bounding the open end, said member having a connection to the other electrode.

HUBERT E. WOODRING.